(12) United States Patent
Lais et al.

(10) Patent No.: US 8,533,991 B2
(45) Date of Patent: Sep. 17, 2013

(54) THERMOFORMED GROW TUBE

(75) Inventors: Joseph F. Lais, Mendota Heights, MN (US); Stephen J. Tillmann, Mendota Heights, MN (US)

(73) Assignee: Plantra, Inc., Mendota Heights, MN (US)

( * ) Notice: Subject to any disclaimer, the term of this patent is extended or adjusted under 35 U.S.C. 154(b) by 244 days.

(21) Appl. No.: 13/094,470

(22) Filed: Apr. 26, 2011

(65) Prior Publication Data

US 2011/0258923 A1 Oct. 27, 2011

Related U.S. Application Data

(60) Provisional application No. 61/328,055, filed on Apr. 26, 2010, provisional application No. 61/387,814, filed on Sep. 29, 2010.

(51) Int. Cl.
*A01G 13/02* (2006.01)

(52) U.S. Cl.
USPC ............................................. 47/32.4

(58) Field of Classification Search
USPC ............. 47/2, 19.1, 29.1, 29.7, 30, 32.4, 32.6
See application file for complete search history.

(56) References Cited

U.S. PATENT DOCUMENTS

| | | | | |
|---|---|---|---|---|
| 195,913 A | * | 10/1877 | Antisdale | 47/30 |
| 361,241 A | | 4/1887 | Rugg | |
| 379,948 A | | 3/1888 | Frantz | |
| 459,804 A | * | 9/1891 | White | 47/3 |
| 502,559 A | * | 8/1893 | Gilman | 47/32.4 |
| 560,966 A | | 5/1896 | Brown | |
| 645,518 A | | 3/1900 | Watt | |
| 770,461 A | | 9/1904 | Haggerty | |
| 796,741 A | * | 8/1905 | Lloyd | 47/32.4 |
| 1,116,961 A | * | 11/1914 | Weixler | 47/32.4 |
| 1,423,659 A | | 7/1922 | Hassel | |
| 1,485,924 A | | 3/1924 | Hobbs | |
| 1,548,682 A | | 8/1925 | Gulin | |
| 2,056,136 A | | 9/1936 | Hyatt | |
| 2,769,277 A | * | 11/1956 | Keelor | 47/33 |

(Continued)

FOREIGN PATENT DOCUMENTS

| | | | |
|---|---|---|---|
| DE | 3715632 A1 * | 10/1987 | 47/32.1 |
| WO | WO 93/03603 | 4/1993 | |

OTHER PUBLICATIONS

Specifications—ITB 001IT818337; Tree Shelters for Maryland Department of Natural Resources Forest Services; 3 pages.

*Primary Examiner* — Frank T Palo

(74) *Attorney, Agent, or Firm* — Patterson Thuente Pedersen, P.A.

(57) ABSTRACT

A grow tube formed from a sheet of thermoform polymer to include a plurality of longitudinal ribs that protrude in a first direction normal to the plane of the sheet. When rolled into a grow tube, the ribs can extend radially inward and act as cushions that prevent the stem of the resident plant from colliding with or resting on the continuous rim of the grow tube. The ribs can also define vertically oriented channels that are open to the interior of the grow tube. Natural convection currents develop in the channels, promoting air exchange between the interior of the grow tube and the surroundings. The ribs can promote diffusion of the incoming sunlight. In one embodiment, the grow tube includes snap forms that overlap when the sheet is rolled into tubular form to provide a flangeless grow tube.

15 Claims, 14 Drawing Sheets

(56) References Cited

U.S. PATENT DOCUMENTS

| | | |
|---|---|---|
| 2,996,842 A | 8/1961 | Weston |
| 3,218,759 A | 11/1965 | Barrons |
| 3,384,992 A | 5/1968 | Heffron |
| 3,816,959 A | 6/1974 | Nalle, Jr. |
| 3,826,040 A | 7/1974 | Roberts et al. |
| 3,828,473 A | 8/1974 | Morey |
| 4,052,815 A | 10/1977 | Clark |
| 4,244,156 A | 1/1981 | Watts, Jr. |
| 4,256,046 A | 3/1981 | Salvano |
| 4,268,992 A | 5/1981 | Scharf |
| 4,357,884 A | 11/1982 | Rast, Jr. |
| D298,998 S | 12/1988 | Hurlstone |
| 4,829,707 A | 5/1989 | Koffler et al. |
| 4,899,486 A | 2/1990 | Huristone |
| 4,903,431 A | 2/1990 | Stoll |
| 4,922,652 A | 5/1990 | Graves |
| 5,060,416 A | 10/1991 | Rohde |
| 5,090,155 A | 2/1992 | Rodgers |
| 5,222,325 A | 6/1993 | Angus |
| 5,241,784 A * | 9/1993 | Henry .......................... 47/66.1 |
| 5,263,278 A | 11/1993 | Valenti, Jr. |
| 5,323,566 A | 6/1994 | Mills |
| 5,345,711 A | 9/1994 | Friesner |
| 5,375,368 A | 12/1994 | Motz, Jr. |
| 5,426,887 A | 6/1995 | Spencer et al. |
| 5,471,783 A | 12/1995 | McLean |
| 5,479,741 A | 1/1996 | Underwood |
| 5,505,020 A | 4/1996 | North |
| 5,513,466 A | 5/1996 | Mercier |
| 5,566,503 A | 10/1996 | Nickson |
| 5,581,935 A | 12/1996 | Anderson |
| 5,613,320 A | 3/1997 | Thomasson et al. |
| 5,669,177 A | 9/1997 | Frounfelker |
| 5,687,505 A | 11/1997 | Haufler et al. |
| 5,692,337 A | 12/1997 | Motz, Jr. |
| 5,809,689 A | 9/1998 | Mathur |
| 5,819,468 A | 10/1998 | Jollie |
| 5,970,653 A | 10/1999 | Liang et al. |
| 6,012,249 A | 1/2000 | Cheney |
| 6,038,810 A | 3/2000 | Kocsis, Jr. |
| 6,088,952 A | 7/2000 | Wilson |
| 6,108,970 A * | 8/2000 | Ball .......................... 47/48.5 |
| 6,119,392 A | 9/2000 | Lais |
| 6,138,404 A | 10/2000 | Lais et al. |
| 6,219,962 B1 | 4/2001 | Due |
| 6,233,868 B1 | 5/2001 | Hahn et al. |
| 6,263,613 B1 | 7/2001 | King et al. |
| 6,357,172 B1 * | 3/2002 | Risgaard et al. .......... 47/32.4 |
| 6,378,459 B1 | 4/2002 | Potente |
| 6,588,143 B1 | 7/2003 | Merrell |
| 6,588,144 B1 | 7/2003 | Staggs |
| 6,698,135 B1 | 3/2004 | Robbins |
| 7,650,716 B1 | 1/2010 | Schemeley |
| 2003/0056434 A1 * | 3/2003 | Gleadall .................. 47/32.4 |
| 2011/0258923 A1 * | 10/2011 | Lais et al. ................ 47/32.6 |

\* cited by examiner

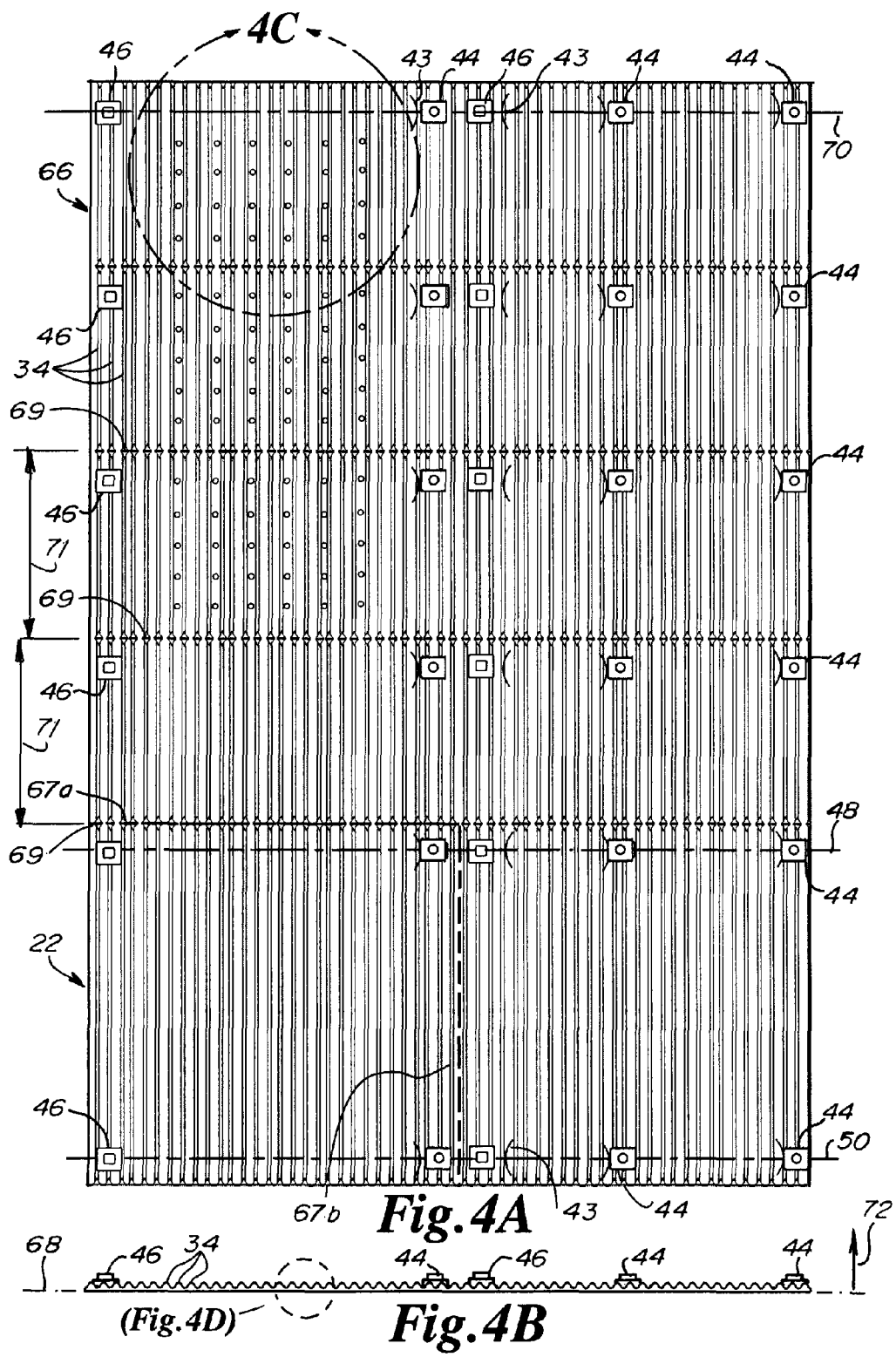

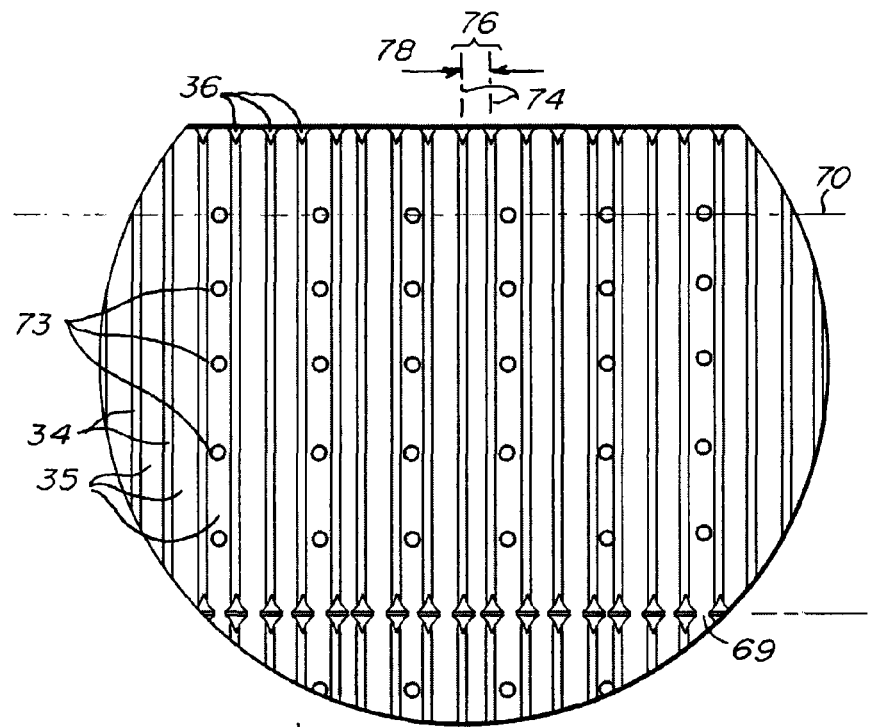
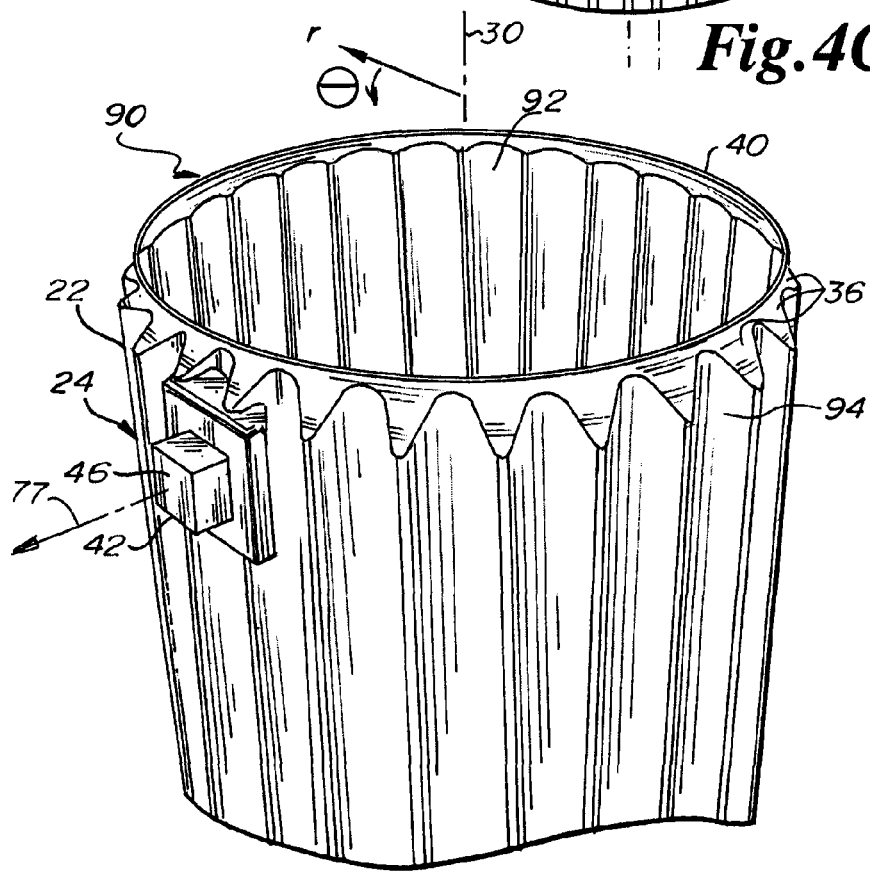
Fig.4C
Fig.5

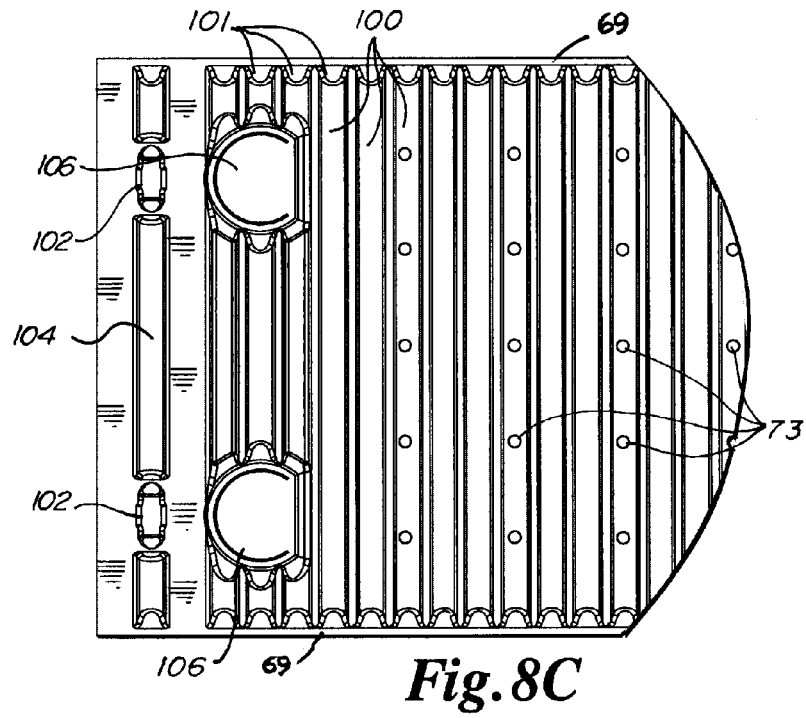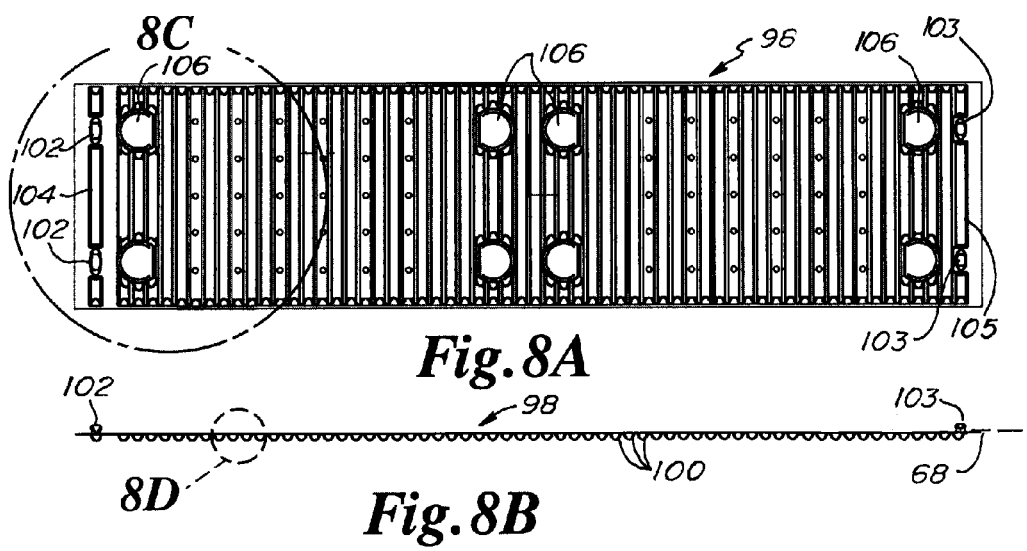

LINE OF CONTACT

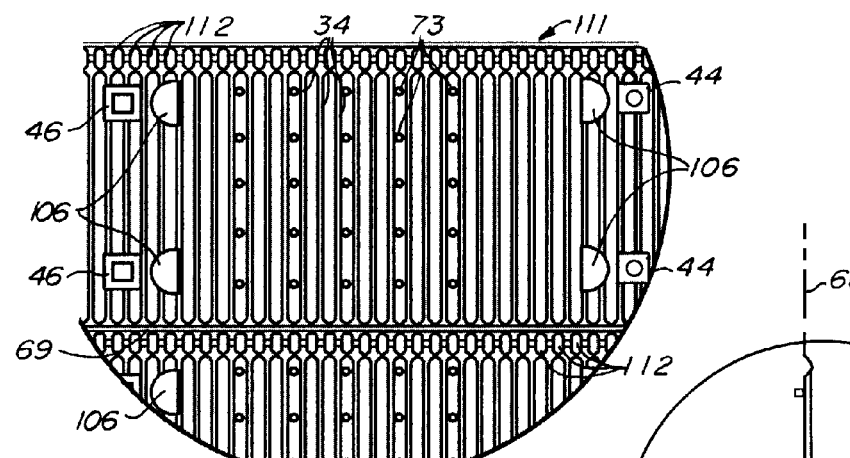
*Fig.11C*
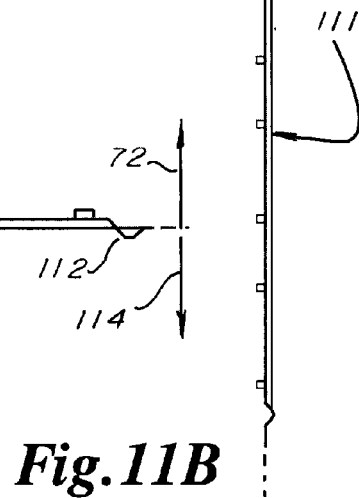
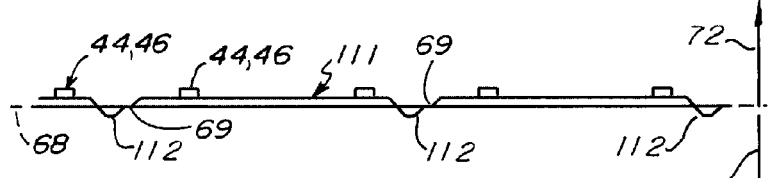
*Fig.11D*
*Fig.11B*

THERMOFORMED GROW TUBE

RELATED APPLICATIONS

This application claims the benefit of U.S. Provisional Application No. 61/328,055, filed Apr. 26, 2010, and U.S. Provisional Application No. 61/387,814, filed Sep. 29, 2010, each of which is hereby fully incorporated herein by reference.

FIELD OF THE INVENTION

The disclosed invention relates generally to the field of tree shelters and grow tubes. More specifically, the invention relates to methods and structures for enhancing the performance of tree shelters and grow tubes.

BACKGROUND

Tree shelters were originally developed to prevent biotic stress caused by mammalian herbivory. This was accomplished by enclosing the seedling in a protective tube open at both ends to allow root and shoot growth. The height of the tube was a function of the stature of the herbivore. For example, 600-mm is considered adequate protection against rabbit browsing while 1200- to 1500-mm height tubes are generally prescribed to prevent deer browsing.

Tree shelters are a sub-category of what is referred to herein as "grow tubes." A grow tube is a plant growth device that facilitates and promotes rapid and permanent establishment of the resident plant, even where mammalian herbivory is not a factor. In horticultural systems plant survival is generally not as high as in the wild, but there is still benefit to some level of protection. Additional benefit of a grow tube is to hasten and lower the cost of plant establishment. In a wild setting the first purpose is to ensure survival. But even in the wild setting, a component of plant establishment is to outgrow competing vegetation for nutrients, water and sunlight. Hence, rapid growth is generally considered advantageous whether in a horticultural or a wild setting.

Thermoformed grow tubes are known to provide the advantages of a structure that possesses both columnar and radial strength while consuming less material than either extruded or molded grow tubes. However, stock forms for thermoformed grow tubes tend to be more bulky and thus more costly to ship than extruded and certain molded stock forms. Also, the resilience of the thermoformed materials is known to exacerbate the problems of stem abrasion because of the hard or sharp edges that define the mouth of the tubes.

A thermoformed grow tube that addresses these various disadvantages would be a welcome addition to the horticultural and agricultural industries.

SUMMARY OF THE INVENTION

Various embodiments of the invention include a grow tube that is formed from a thermoformed sheet stock having structure that can be rolled by hand and assembled in the field. The thermoformed sheet stock can include structure that, when rolled into the grow tube shape, prevents stem abrasion as well as mitigating the causes of pressure point wounds. The structures thermoformed into the sheet stock can also enhance both the axial and the hoop stiffness to the grow tube, promote the natural convective exchange between the interior of the grow tube and the surroundings, and can be configured to diffuse the incoming solar radiation. The structure can also prevent the leaves of the resident plant from sticking to the interior surface of the grow tube, while the natural convective exchange promote the drying of the leaves in contact with the interior surface, thus preventing the formation of fungus on the leaves.

In some embodiments of the invention, the thermoformed sheet stock can include mating structures that enable the grow tube to be secured as a flangeless surround (e.g., an open-ended cylinder) without resort to adhesives or separate fasteners. The thermoformed sheet stock can be cut to size, and/or joined with other form sheets to provide flexibility in the dimension of the assembled grow tube.

Various embodiments of the invention include a grow tube that is formed from a thermoformed sheet stock having structure that can be easily rolled by hand and assembled in the field. The thermoformed sheet stock can include structure that, when rolled into the grow tube shape, enhances both the axial and the hoop stiffness of the grow tube, promotes the natural convective exchange between the interior of the grow tube and the surroundings, and can be configured to diffuse the incoming solar radiation.

The structure can also prevent the leaves of the resident plant from sticking to the interior surface of the grow tube, while the natural convective exchange promote optimal moisture relations of the leaves in contact with the interior surface, thus preventing the formation of fungus on the leaves.

The thermoformed sheet stock also includes mating structures that enable the grow tube to be secured as a surround (e.g., an open-ended cylinder) without resort to adhesives or separate fasteners. This overlap adds strength to the design vertically and horizontally and, by doubling the thickness at attachment points, resists tearing after installation. The overlap also, by way of its interlocking geometry, creates an effective seal against unwanted entry of herbicides used to control competing weed at the point of tube closure. The thermoformed sheet stock can be cut to size, and/or joined with other thermoformed sheets to provide flexibility in the dimension of the assembled grow tube.

The thermoformed sheet stock has advantages through sheet formulation where one or more colors can be blended into the sheet creating alternating bands vertically, diagonally, and horizontally. These bands could serve as important branding elements to distinguish the thermoformed product from others seen in the field.

There are three primary methods for manufacturing stock for plant protection devices: extrusion, molding (e.g., injection molding, rotational molding) and thermoforming. With extrusion, a sheet stock can be extruded and subsequently rolled into a cylinder to form the grow tube. Extrusion can produce sheet stock with two-dimensional cross-sections and can include geometrical features that require varying thickness across the cross-section. An example of an extruded grow tube can be found at U.S. Patent Application Publication No. 2009/0272031 to Lais et al. (Lais '031), assigned to the assignee of the instant application and incorporated by reference herein in its entirety except for definitions contained therein. Lais discloses dual wall grow tubes, which is an example of a two-dimensional cross-section. Another example of an extruded plant protection device is found at U.S. Pat. No. 5,060,416 to Rohde, featuring a corrugated cross section designed to protect tree trunks from the impact of lawn care equipment.

The two-dimensional cross-section of an extruded grow tube can provide enhanced columnar strength, particularly when rolled into a cylinder. However, extruded structures are not readily varied in the third dimension, i.e. in the direction of extrusion. Features such as tangential or lateral ribs (ribs on the plane of the sheet stock that are lateral to the direction of extrusion) cannot be formed by the extrusion process.

Therefore, extruded grow tubes tend to lack radial strength when rolled into a cylinder. The primary variable for producing radial strength in an extruded grow tube is the overall thickness of the two-dimensional cross-section. Drawbacks to increasing the thickness include higher material costs and increased attenuation of sunlight for grow tubes where radiation through the walls is a consideration. Also, material selection can be limited to softer, more pliable materials in order to be able to roll the sheet stock having the greater thickness.

Molding is also a viable process for fabricating grow tubes. Rohde, for example, discloses injection molding as an alternative to extrusion for producing a corrugated wall structure. Molding (e.g., injection or rotational) can be used to create three-dimensional shapes that provide both columnar strength and radial strength, and also three-dimensional geometrical features of varying thickness. However, increased thickness is still required in order to facilitate the molding process.

Thermoforming, also referred to as vacuum forming, can produce sheet stock having three-dimensional structure akin to molding, thus providing grow tubes having columnar strength and radial strength. In the thermoforming process, a flat polymer sheet is heated to a softening point, and then drawn under vacuum into a mold, where the polymer cools and assumes the shape defined by the mold. Examples of thermoformed grow tubes include U.S. Pat. No. 6,119,392 to Lais (Lais '392), assigned to the assignee of the instant application, and U.S. Pat. No. 6,357,172 to Risgaard et al., both of which are hereby incorporated by reference herein in their entirety except for definitions contained therein.

An advantage of a thermoformed stock is that the walls can be very thin while still providing the requisite strength. The thin walls can result in reduced material costs and provide less inherent attenuation of sunlight, thus providing the grow tube designer a wider range of sunlight attenuation with which to tailor the transmittance characteristics through the grow tube walls.

Also, the thin walls of a thermoformed stock can be formed to have more pronounced features without requiring a substantial increase in material thickness. For example, ribs that are formed on a thermoformed sheet stock can be formed to have a high aspect ratio (radial depth to tangential spacing) without requiring substantially more material. Both extruded and molded products would require that greater material thicknesses accompany the higher aspect ratios.

Thermoforming can also be used in conjunction with extrusion to provide additional aspects. For example, a co-extrusion process can be implemented to provide a sheet having two layers, with the first layer having properties that are different from the second layer. The differing properties can include, but are not limited to, color, transmittance, reflectance, hardness, strength and/or texture. The extruded sheet can then be formed to have desirable three-dimensional aspects or other characteristics that are unavailable in the extrusion process but readily implemented by thermoforming.

Therefore, thermoforming provides several advantages over other manufacturing forms that are advantageous in the design and fabrication of grow tubes.

A limitation of thermoforming and vacuum forming is that the thickness of the material is substantially uniform or constant, and is usually relatively thin in order to comply with the thermoforming process. For the thin walls to have structural integrity, the materials of a thermoformed grow tube will typically be quite resilient. The resilience can create difficulties in rolling and maintaining the sheet stock in cylindrical form because of the "shape memory" that the resilient thermoformed stock possesses. Accordingly, instead of being rolled from a planar stock, some thermoformed grow tubes (e.g., Risgaard) comprise arcuate shells that are joined together with fastening structures (e.g., "snaps") to form a cylindrical shape, thus avoiding the complications caused by the material resiliency. The fastening structures, as Risgaard discloses, can be integrally formed on flange portions that extend radially outward from the cylindrical body of the grow tube.

Other thermoformed structures include distinct hinge regions (e.g., Lais '392) about which the stock can be articulated. By limiting the bending to a few (e.g., one or two) hinge regions, the restorative force caused by the shape memory of the thermoformed stock is minimized and can be readily overcome by joining the fastening structures together at the flange portions. To provide closure, such structures can also include integral flange portions having fastening structures that are joined, as disclosed by Lais '392. With some thermoformed structures, the deformation in the hinge region is sufficient to cause plastic deformation, thus reducing the restorative force exerted by articulation of the hinge.

The flanged arrangements such as disclosed by Risgaard and Lais '392 pose disadvantages in the field. The flange portions, which project radially beyond the substantially cylindrical body of the grow tube, can catch the wind, thereby exerting additional stresses on the grow tube assembly than would a flangeless grow tube. The flange portions can also be snagged by passing objects, such as browsing animals and ground keeping equipment (e.g. lawn mowers).

Such flanged arrangements are also not conducive to use with a rolled thermoform stock. The restorative force of the shape memory exerts a tension force on the fastening structures which can cause the fastening structures to decouple over time.

Also, because the thermoformed stock is not rolled in the field, they are preformed with arcuate segments that when joined form the grow tube enclosure. Such arcuate segments, which are exemplified in both Risgaard and Lais '392, are bulkier than a substantially planar sheet stock, and therefore do not package for shipping purposes as well as a substantially planar sheet stock.

Another problem with grow tubes generally is stem damage caused by interaction between the resident plant and the rim that defines the open mouth of the grow tube. As the resident plant grows within a grow tube, it eventually "crowns," i.e. emerges from the top of the grow tube. We have identified two primary types of stem damage: stem abrasion and pressure point wounds.

Stem abrasion is a phenomenon that is widely known in the plant development industry. Stem abrasion is caused by the action of the wind on the crown causing the trunk of the sapling (also referred to as the "stem") to collide with the rim of the grow tube. The tender young bark is easily worn away, particularly of the rim of the grow tube is hard or sharp. If unchecked the stem may become girdled, particularly with winds that change direction and act to create a continuous cut around the diameter of the stem. A girdled tree is cut off from delivering water to the leaves of the crown, and also from delivering food from the leaves to the roots, and will soon die.

The conditions conducive to stem abrasion include a high wind load on the crown and a straight, vertical stem proximate the rim of the grow tube. (A stem that is not straight and vertical may suffer local damage from wind interaction with the rim, but may not be girdled because the damage will not be symmetrical around the outer diameter of the stem.)

A pressure point wound is another form of damage. Pressure point wounds are caused by continuous single line contact between the stem and the grow tube rim. The pressure restricts vascular flow of sap and causes a lesion to form. The resident plant responds with swelled callous growth around the wound and eventually grows over.

While a wind load on the crown can exacerbate a pressure point wound in presence of a continuous rim, wind is not the primary mechanism. Rather, the conditions conducive to pressure point wounds are a rapidly growing central stem of primarily un-lignified green wood, and a phenomenon commonly referred to as "bent stem." Bent stem can vary by species and site conditions, but generally occurs when a green stem crowns to a length of about 18 inches above the rim of the grow tube. The green stem will yield to the prevailing wind when under load, and cannot straighten out because of the un-lignified state. The green stem will lignify in the bent shape if left uncorrected. The bent shape can also cause the stem to be in constant contact with the rim. The bark of the green stem is living tissue, or at least there is living tissue very near the surface. The cells under the line of contact are constantly under pressure, and are also cut off from nutrients due to the pressure line. The result is that the cells under the continuous line of pressure die. A lesion forms and the plant responds by forming a callous tissue over the lesion. It is noted that because of the bent shape, the stem usually cannot be abraded all the way around to cause girdling.

A paradigm of the industry is that a continuous rim that is flared or rolled is an advantageous feature because it militates against stem abrasion. The rounded contour provided by the flared or rolled structure provides a blunt surface, which is less damaging to the stem than a sharp or cornered edge as the stem collides with the tube during windy conditions.

However, the rounded, continuous contour does little to reduce pressure point wounds. The flared or rounded rim still provides a continuous line of contact over a portion of the stem surface.

Various embodiments of the invention include structure which mitigates the effects of both stem abrasion and pressure point wounds. These embodiments include structure that protrudes inward near the rim of the open end of the grow tube. These structures provide blunted, non-continuous contact on the perimeter of the stem that both holds the stem away from the continuous, sharper rim and also provides multiple points of contact rather than a continuous line. In addition, the non-continuous contact is advantageous over the continuous flared or rounded rims in the art in at least two ways: First, as the plant moves due to wind or other forces, the stem shifts to a different position relative to the structure, which shifts the points of contact to different points on the stem, thereby relieving the cells that were previously under pressure. Note that, in contrast to the continuous rim devices of the prior art, the wind becomes an ally by helping to shift the stems to rest on different pressure points. Second, the cells neighboring the cells under pressure are still receiving nutrients, which avoids areas of stagnation that exacerbates lesion formation. Accordingly, certain structures disclosed herein provide abatement for both stem abrasion and pressure point wounds.

Structurally, various embodiments of the invention comprise a plurality of longitudinal ribs that protrude in a first direction normal to a sheet plane defined by the thermoformed sheet stock. Each of the plurality of longitudinal ribs define an elongate axis to define a plurality of elongate axes, the plurality of elongate axes being substantially parallel to each other. The plurality of elongate axes are spaced apart to define a lateral dimension between respective elongate axes, each of the longitudinal ribs having a cross-section that defines a normal dimension that is normal to the sheet plane. In one embodiment, the ratio of the lateral dimension to the normal dimension is less than 3-to-1.

In one embodiment, the longitudinal ribs are configured to provide spacing between the stems of the resident plant and the end or ends of the grow tube, thus reducing or eliminating the amount of contact between the plant stems and the rim of the grow tube and limiting stem abrasion. The ends of the longitudinal ribs can be rounded to provide blunted, non-continuous contact with the stem of the resident plant to limit the effects of pressure point wounds. In another embodiment, a separate row of protrusions are configured near the end(s) of the grow tube that project radially inward to provide the spacing, while the longitudinal ribs themselves are oriented to project radially outward.

Certain embodiments of the invention include a male snap form and a female snap form configured to snappingly engage with each other, each of the male and female snap forms defining protrusions on the sheet that extend in the same direction from the sheet plane. The male and female snap forms that are to be engaged can be located on a common lateral axis that is orthogonal to the elongate axes. The snaps can be configured to align along an axis that extends in the radial direction, instead of along an axis that is in a direction normal to the radial direction. This arrangement not only eliminates the need for a radially protruding flange, but also enhances the strength of the snap because the engaging elements are placed in shear, not in tension.

Furthermore, the snaps can be positioned on the ribbed portions so that when the snaps are engaged, the ribs overlap. The overlapping regions are then also placed in shear to provide additional resistance to the unfurling forces of the shape memory.

Accordingly, the snaps are less prone to becoming decoupled or failing due to fatigue over time. The advantages of snaps being placed in shear and rib portions being overlapped are not available in flanged designs. The flangeless aspect also lowers the profile of the grow tube, thereby reducing the effects of wind and the chances of the tube being snared by passing objects. Access slits can be located near the snap forms to enable an installer reach through the wall of the grow tube and engage the snaps.

The grow tube can be perforated with venting apertures that provide or promote the following advantages:
 Air flow within in the assembled tube chamber either along its entire height or above a zone designated as a spray shield for weed controlling herbicides applied by growers. Air flow promotes gas, exchange especially carbon dioxide replenishment for fueling photosynthesis by the plant;
 Temperature modification that can achieve conditions closer to ambient and reduce heat stress, especially during the autumn season to promote proper dormancy prior to winter;
 Stem thickening as an adaptive response to air-induced movement;
 Additional sources of unfiltered yet controlled sunlight.

The thermoformed sheet stock may be comprised of any material that can be configured with the requisite structure, such as a thermoformed plastic or environmentally advantageous properties such as recycled products (e.g., recycled polyethylene terephthalate, or RPET) and/or materials that are biodegradable (e.g., biodegradable PET). Generally, the biodegradable materials are more readily available in a thermoformed platform than in an extruded or molded platform.

In another embodiment of the invention, the thermoformed grow tube is moored with a channeled stake that covers and protects the snaps. Traditional round stakes can interfere with the snaps for configurations where the snaps protrude radially outward, causing the stake to either damage the snaps or an unstable registration between the stake and the grow tube. The channeled stake, so-named because the cross-section defines a channel, can be dimensioned so that the protruding snaps are covered by the channeled stake. The channeled stake can be drawn tightly against the grow tube with cable ties so that the flanges of the channel provide two lines of registration that straddle the snaps. The channeled stake provides other advantages, such as a reduced cross-section that requires the movement of less soil upon entry into the earth, and thus requiring less energy to install. The channel can be made of a variety of materials, including wood or wood fibers for biodegradability, or resin materials such as fiber reinforced plastic for long term life and reusability. Channeled stakes can also be nested compactly compared to traditional oak or bamboo stakes, thus reducing bulk storage space in bulk and problems associated with shipping.

BRIEF DESCRIPTION OF THE DRAWINGS

FIG. 4A is a plan view of a thermoformed sheet from which the grow tube of FIG. 1 is cut;

FIG. 4B is an elevation view of the thermoformed sheet of FIG. 4A;

FIG. 4C is an inset view of the thermoformed sheet of FIG. 4A;

FIG. 5 is a partial perspective view of a thermoformed grow tube in a second embodiment of the invention;

FIG. 8A is a plan view of a thermoformed sheet from which the grow tube of FIG. 8 is rolled;

FIG. 8B is an elevation view of the thermoformed sheet of FIG. 8A;

FIG. 8C is a partial enlarged view of the thermoformed sheet of FIG. 8A;

FIG. 11B is an elevation view of the formed sheet of FIG. 11A;

FIG. 11C is an inset view of the formed sheet of FIG. 11A;

FIG. 11D is a partial sectional view of the formed sheet of FIG. 11B;

DETAILED DESCRIPTION

Figure 1:
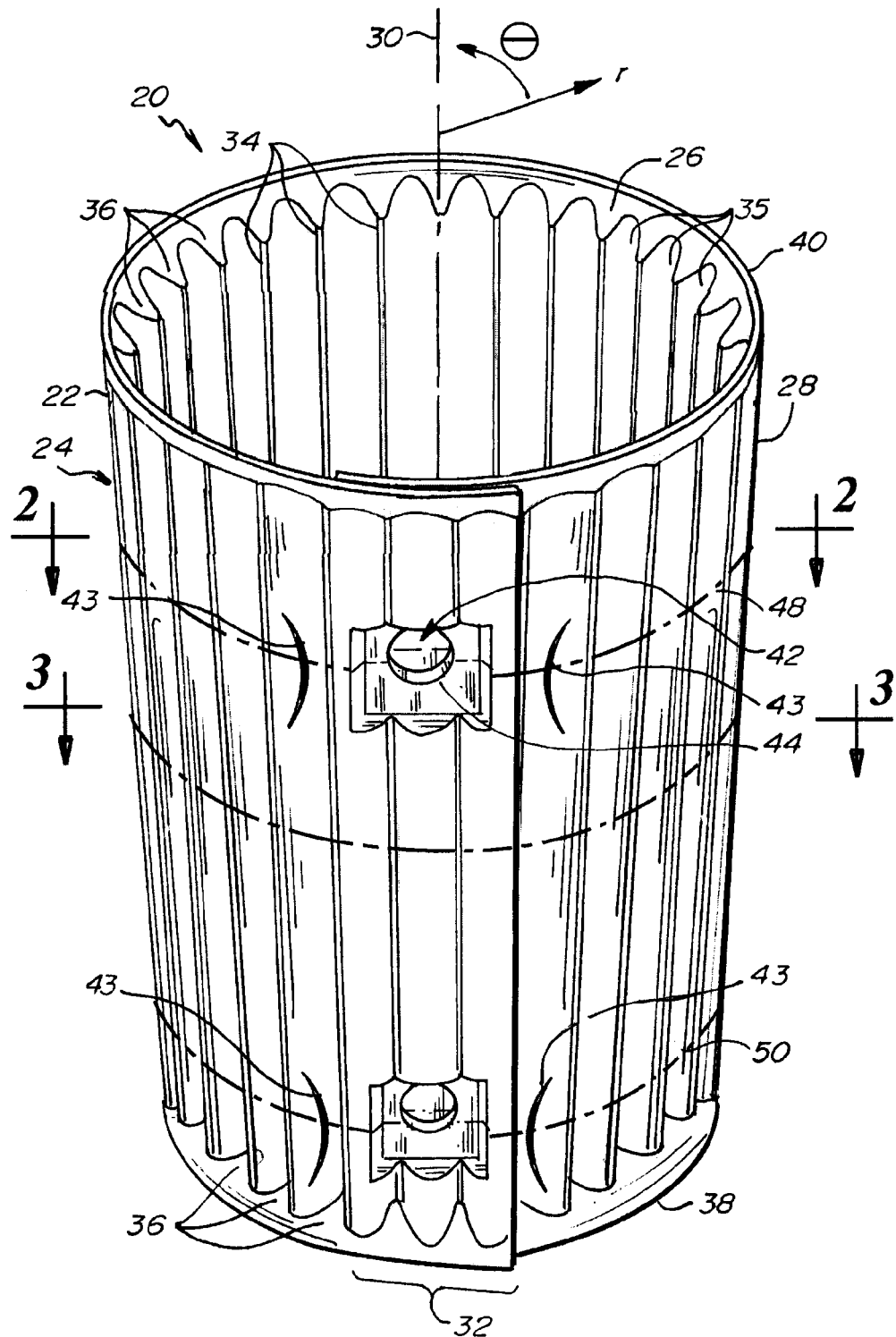
FIG. 1 is a perspective view of a thermoformed grow tube in a first embodiment of the invention.
Figure 2:
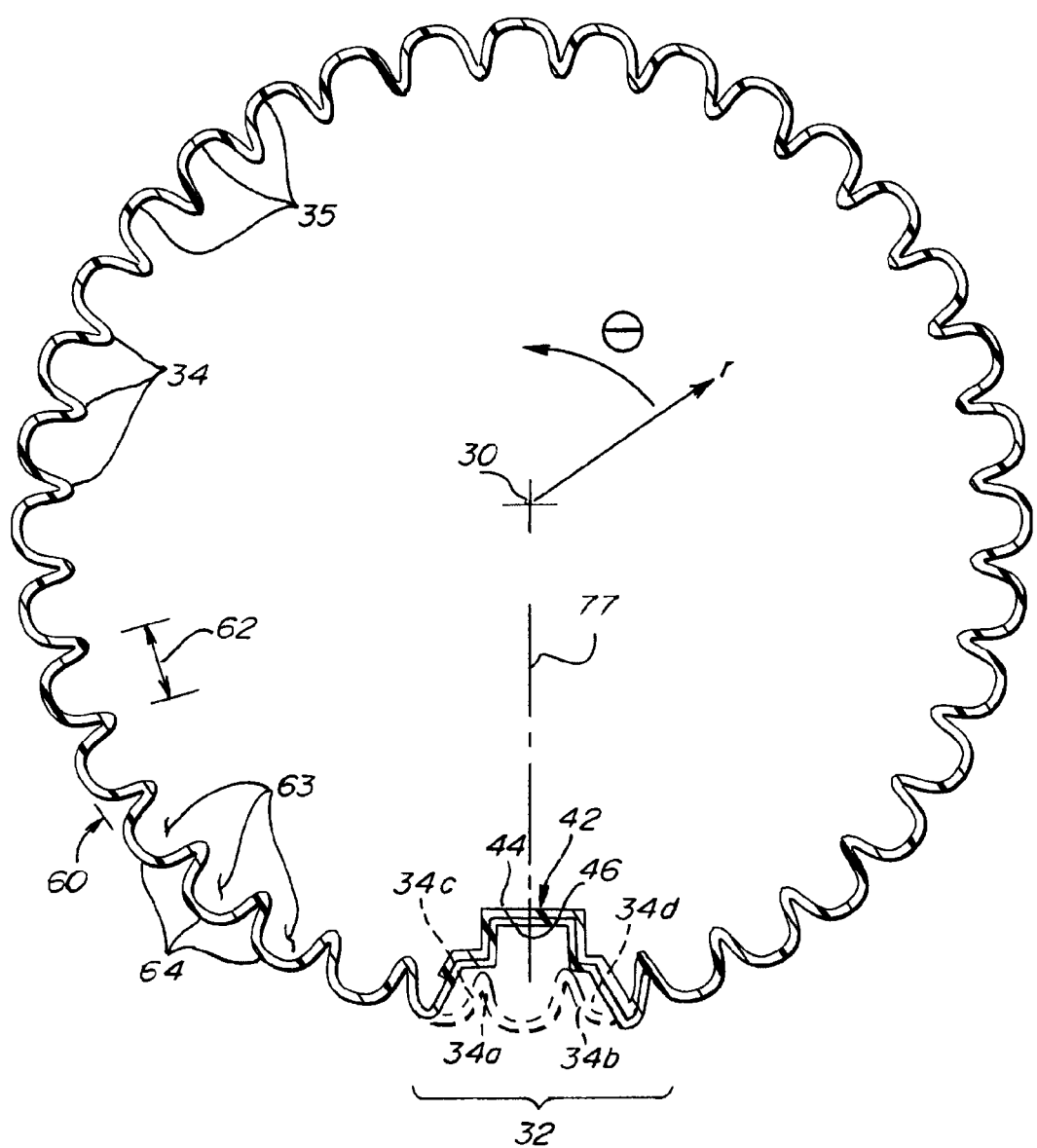
FIG. 2 is a first sectional view of the thermoformed grow tube of FIG. 1.
Figure 3:
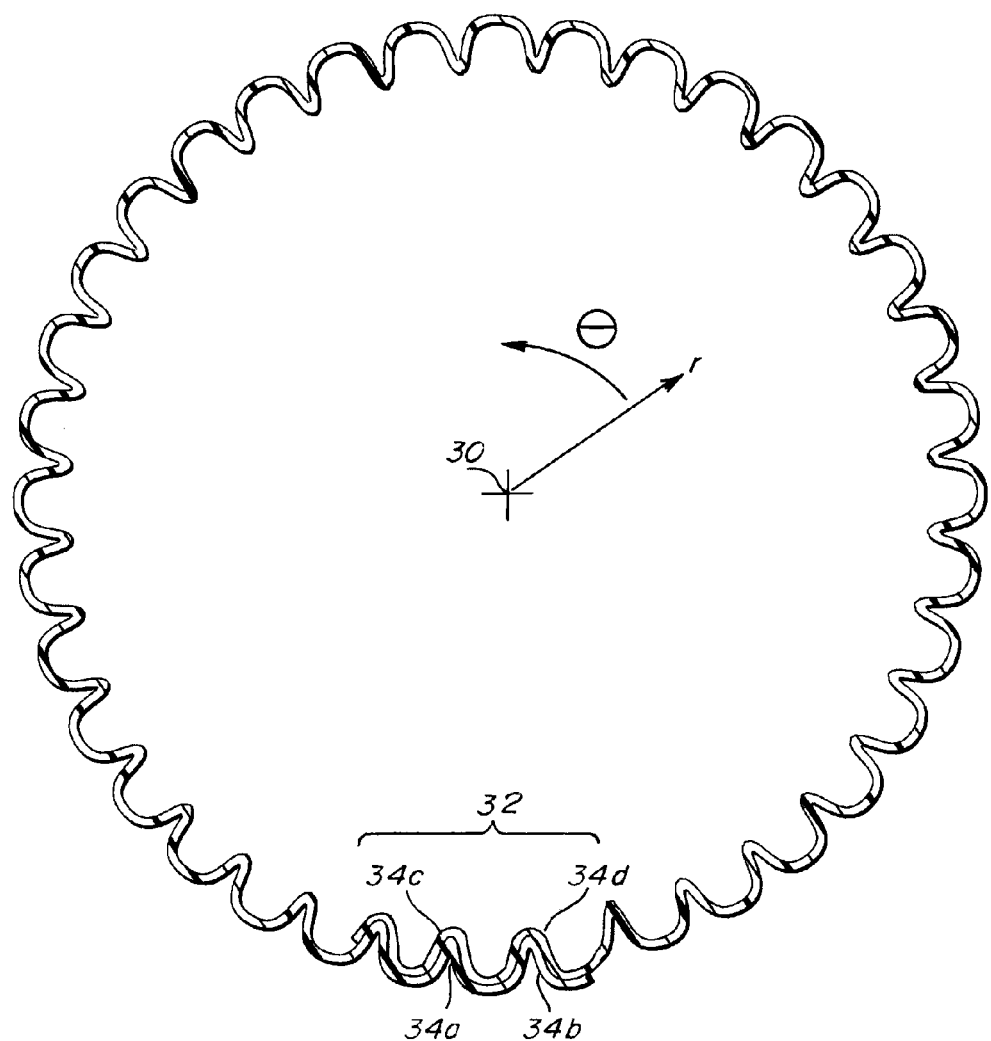
FIG. 3 is a second sectional view of the thermoformed grow tube of FIG. 1.

Referring to FIGS. 1 through 3, a grow tube 20 is depicted in an embodiment of the invention. The grow tube 20 comprises a polymer sheet 22 rolled into the shape of a cylinder 24 having an interior surface 26 and an exterior surface 28 and defining an axial or central axis 30. The cylinder 24 includes an overlap region 32 where the ends of the rolled polymer sheet 22 overlap. In one embodiment, the grow tube 20 includes a plurality of longitudinal ribs 34 separated by web portions 35 and extending axially along the interior surface 26 of the grow tube 20. Each of the longitudinal ribs 34 can include tapered transitions 36 near a bottom end or rim 38 and a top end or rim 40 of the cylinder.

A plurality of snaps 42 are located in the overlap region 32. Each snap comprises a male snap form 44 and a female snap form 46, best seen in FIG. 2. A slit 43 can be located adjacent each snap 42 to provide access in order to snappingly engage the male and female snap forms 44 and 46 of the respective snap 42. In the depicted embodiment, the male snap form 44 and the female snap form 46 of a given one of the plurality of snaps 42 are located on a common lateral or tangential axis 48 or 50 that is on a plane 52 or 54 that is normal to the central axis 30. Also, the male snap form 44 and the female snap form 46 of the given snap 42 are located at the same tangential location relative to the longitudinal ribs on which they are located. That is, in the particular depiction of FIGS. 1 through 3, the male snap form 44 is substantially centered between two adjacent longitudinal ribs 34a and 34b; likewise, the female snap form 46 is substantially centered between two adjacent longitudinal ribs 34c and 34d. The longitudinal ribs 34a, 34b, 34c and 34d are depicted in phantom in FIG. 2 to demonstrate the centering. The male and female snap forms 44 and 46 need not be centered between longitudinal ribs as depicted herein, but should be centered at the same location relative to the longitudinal rib or ribs upon which the snap 42 is centered.

The longitudinal ribs 34 can be characterized as having a radial dimension 60 and a lateral or tangential spacing dimension 62 (i.e. the spacing between two adjacent longitudinal ribs). In the depicted embodiment, the radial dimension 60 is on the same order as the tangential spacing dimension 62. Open vertical channels 63 are also defined by the web portions 35 between the longitudinal ribs 34 on the interior surface 26 of the grow tube 20 that are generally unobstructed along their length. The web portions 35 also increase the surface area exposed on the exterior surface 28 of the cylinder 24, effectively providing a finned structure 64.

Figure 4D:
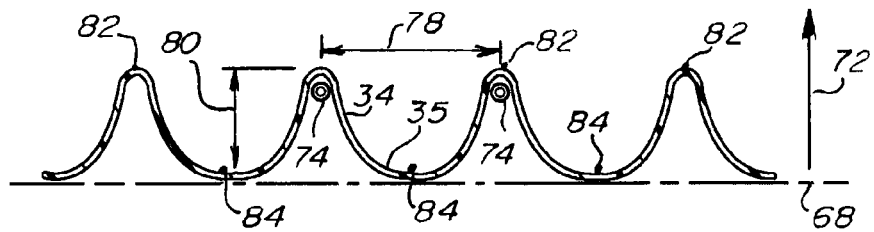
FIG. 4D is a partial sectional view of the thermoformed sheet of FIG. 4B.

Referring to FIGS. 4A, 4B, 4C and 4D a formed sheet 66 is depicted in an embodiment of the invention, from which the polymer sheet 22 can be cut. A lateral cut line 67a and a longitudinal cut line 67b for the polymer sheet 22 is depicted in FIG. 4A. The lateral axes 48 and 50 have also been superimposed on the formed sheet 66, along with another lateral axis 70 (FIGS. 4A and 4C). The formed sheet 66 defines a sheet plane 68 (FIGS. 4B and 4D) that is also common to the polymer sheet 22. The plurality of longitudinal ribs 34 protrude in a first normal direction 72 that is normal to the sheet plane 68. In one embodiment, a plurality of ventilation holes 73 are formed on a portion of the thermoformed sheet 66, the vent holes 73 of this particular embodiment being centered on the web portion 35. The cells neighboring the cells under pressure are still receiving nutrients, which avoids areas of stagnation that exacerbates lesion formation.

The formed sheet 66 can include lateral bands or lateral ribs 69 that define sections of various lengths 71. The lateral bands 69 define a "valley" or a "plateau" that traverses laterally across the longitudinal ribs 34 at a substantially constant depth relative to the sheet plane 68. It is noted that the rim 40 is an edge of one such lateral band 69. The formation of the lateral bands 69 also forms the ends of various of the longitudinal ribs 34. Accordingly, the longitudinal ribs 34, being defined between the lateral bands 69, will have a length that is shorter than the length 71 of the respective section in which it resides.

The lateral bands 69, as well as the edges of the formed sheet 66, can serve as reference or datum that define a minimum or shortest distance 71 therebetween. Because the longitudinal ribs 34 of a given section are defined between these datum, the longitudinal ribs 34 will be of shorter length than the respective shortest distance 71.

It is noted that while the lateral bands 69 are depicted herein as being substantially straight and of substantially uniform width, lateral bands of other forms are contemplated to be within the scope of the invention, including lateral bands that are curved and/or that vary in width across the lateral dimension of a formed sheet. Where a non-linear, non-uniform lateral band is utilized, the shortest distance 71 is defined as the minimum distance that separates the lateral bands 69 that is parallel to the longitudinal ribs 34.

Functionally, the lateral bands 69 provide radial stiffness when the formed sheet 66 is rolled. The lateral bands 69 serve as a guide for cutting off sections of the formed sheet 66 to affect grow tubes 20 having a shorter height. When cut, the lateral band 69 of a section defines the rim 38 or 40 of the grow tube, which also provides radial stiffness to the grow tube 20.

Each of the longitudinal ribs 34 can be characterized as defining an elongate axis 74 (two of which are depicted in FIG. 4C) to define a plurality of elongate axes 76 that are parallel to each other and spaced apart by a lateral dimension 78 that serves the basis of the tangential spacing dimension 62 when the polymer sheet 22 is shaped into the cylinder 24. Likewise, the longitudinal ribs 34 can be characterized as having a normal dimension 80 in the first normal direction 72 that serves as the basis of the radial dimension 60. In one embodiment, the plurality of elongate axes 76 are orthogonal to the lateral axes 48, 50 and 70. In the depicted embodiment, the thermoformed sheet 66 further includes lateral creases 81 that are formed orthogonal to the plurality of elongate axes 76.

The polymer sheet 22 can be fabricated from any material and process that enables definition of the various structures (e.g., longitudinal ribs 34 and snaps 42) to be thermoformed thereupon. The polymer sheet 22 can also be configured to possess certain spectral properties that filter the incident rays of the sun to enhance the growth of a resident plant, and can also be textured to promote scattering of the incident rays. U.S. Patent Application Publication No. 2009/0272031 to Lais et al. (Lais '031), incorporated by reference above, discloses spectrally selective grow tubes. The principles disclosed in Lais '031 can be incorporated into various embodiments of the present invention.

The thermoformed sheet 66 can be fabricated from polyethylene and polyethylene terephthalate. In one embodiment, the polymer sheet 22 is fabricated from a biodegradable polymer, such as BIOPET, commercially available from Lindar Forming Corporation of Baxter, Minn., U.S.A. Biodegradable polymers can be left in the field and disked into the soil or otherwise left to return to nature.

In assembly, the thermoformed sheet 66 is cut to provide a polymer sheet 22 (e.g., along the lateral and longitudinal cut lines 67a and 67b) to produce the grow tube 20 of the chosen dimension. The polymer sheet 22 is then rolled or curled about the central axis 30 to form the cylinder 24. The direction of the rolling/curling is such that the elongate axes 76 are substantially parallel to a central axis 30 of the cylinder 24. Because the male and female snap forms 44 and 46 protrude in the same normal direction 72, the female snap form 44 can be tucked inside the cylinder 24 at the overlap region 32 and aligned along a radial axis 77 with the male snap form 46. The assembler can then snappingly engage the male and female snap forms 44 and 46 to secure the grow tube 20 in the cylindrical shape.

The longitudinal cut 67b (i.e. the cut line made parallel to the elongate axes 76) can be cut so that the cut edge that is tucked inside the cylinder 24 is directed away from the interior so that the plant does not rub against the sharp edge. Furthermore, any piercing operation that is used to form the ventilation holes 73 in the web portion 35 can be directed so that any resulting burrs are located within the channel 63. By having the burrs inside the channels 63, the plant cannot reach the burr by virtue of the high aspect ratio. Also, when the polymer sheet 22 is reverse wrapped (discussed below attendant to FIGS. 5-7), the burrs are on the outside of the cylinder 24 and also will not damage the plant.

The thermoformed sheet 66 includes a plurality of male and female snap forms 44 and 46 along a given lateral axis (e.g., lateral axis 70). The plurality of snaps enables one to select from a variety of diameters for the assembled grow tube from the same thermoformed sheet. It is further noted that separate formed sheets can be snapped together side by side to provide additional larger diameters for the grow tube assembly. That is, the male snap forms near the right edge of the thermoformed sheet 66 can be mated to the female snap forms of another formed sheet or polymer sheet to extend the range of diameters. Likewise, the male/female snap forms near the top and bottom edges of the thermoformed sheet 66 could be reversed (not depicted) so that separate formed sheets and/or polymer sheets could be joined end to end to provide additional length to a grow tube assembly.

The slits 43 provide the assembler access to the snaps 42 by inserting a finger through the slit and pinching the male and female snap forms 44 and 46 together. The slits 43 can be particularly useful for engaging mid-span snaps in those embodiments where the length of the assembly requires more than two snaps 42 along the length of the cylinder 24. The tabs formed by the slits 43 are also self closing (i.e. return substantially to their original orientation after use), thus providing a barrier to herbicidal sprays.

Functionally, the longitudinal ribs 34 provide the grow tube 20 with axial stiffness while providing inflection points 82 and 84 (FIG. 4D) that serve as hinges that undergo a majority of the deformation during the rolling/curling phase of the assembly. The hinging action of the longitudinal ribs 34 enabling the polymer sheet 22 to be easily rolled by hand and preventing local buckling of the polymer sheet 22.

Another function of the longitudinal ribs 34 is to prevent the leaves of the occupying plant from sticking against the interior surface 26 of the cylinder 24 over a substantial portion of the leaf surface. If the leaf surface is flush against a flat tube surface there is no air flow making the surface subject to continuous wetting that enables fungal growth on the leaf.

The continuous wetting might also soften the waxy cuticle on the leaf surface allowing entry of the fungal infection.

A high aspect ratio (radial depth to tangential spacing) helps prevent adherence of the leaf to the interior surface 26. Accordingly, the tangential spacing dimension 62 can be sized to be a fraction of the length or width of a leaf of the resident plant (e.g. 30% of the width). This way, a leaf that lays against the interior surface 26 of the cylinder 24 will contact several longitudinal ribs 34, effectively suspending the leaf and thereby preventing the leaf from being in contact over a majority of the leaf surface.

The lateral creases 61 provide increased hoop strength to the cylinder 24. The lateral creases 61 can also act as guides for cutting the polymer sheet 22 to length, and as tangential grooves for registration of ties that fasten the grow tube 20 to a stake.

The channels 63 are generally unobstructed by the resident plant by virtue of the high aspect ratio, thus providing a flow path for air residing within the channels 63. When radiation from the sun is absorbed by the grow tube 20, the air residing within the channels 63 will heat up and become buoyant relative to the air in the central portions of the grow tube 20. The buoyancy causes the air within the channels 63 to rise and exit the grow tube 20, and to be replaced by outside air that is rich in carbon dioxide. Accordingly, the channels provide a mechanism for promoting air exchange within the grow tube 20. Also, the movement of air in close proximity to the interior surface 26 helps keep leaves that are in contact with the interior surface 26 dry, thus preventing fungus growth on the leaves. Furthermore, leaves in contact with the tips of the longitudinal ribs 34 will tend to form a boundary opposite the web, thereby restricting flow to within the channels 63, which can enhance the effect of the flow within the channels 63.

The finned structures 64 on the exterior surface 28 of the grow tube 20 generally enhance heat transfer therefrom, thus militating against overheating of the grow tube 20 and the attendant stresses that overheating can cause on the resident plant.

The tapered transitions 36 provide radial spacing between the stem or stems of the resident plant and the rim 40 of the cylinder 24. The radial spacing limits the amount and degree of contact between the stems that protrude from the top of the grow tube 20 and the edge defined by the rim 40. The limited contact protects the stems from being damaged as the resident plant matures and is flexed by external forces such as wind, rain and animal contact.

The positioning of the male and female snap forms 44 and 46 in the same relative location relative to the longitudinal ribs 34 on which the snap forms 44 and 46 are formed enables the structures of the polymer sheet 22 to mate in the overlap region 32. The mating adds to the stiffness of the grow tube 24, provides additional interlocking and integrity to the snap arrangement, and can promote a circular shape of the cylinder 24. The overlap region 32 also provides a seal or labyrinth that prevents herbicide sprays from entering the cylinder 24.

Figure 6:
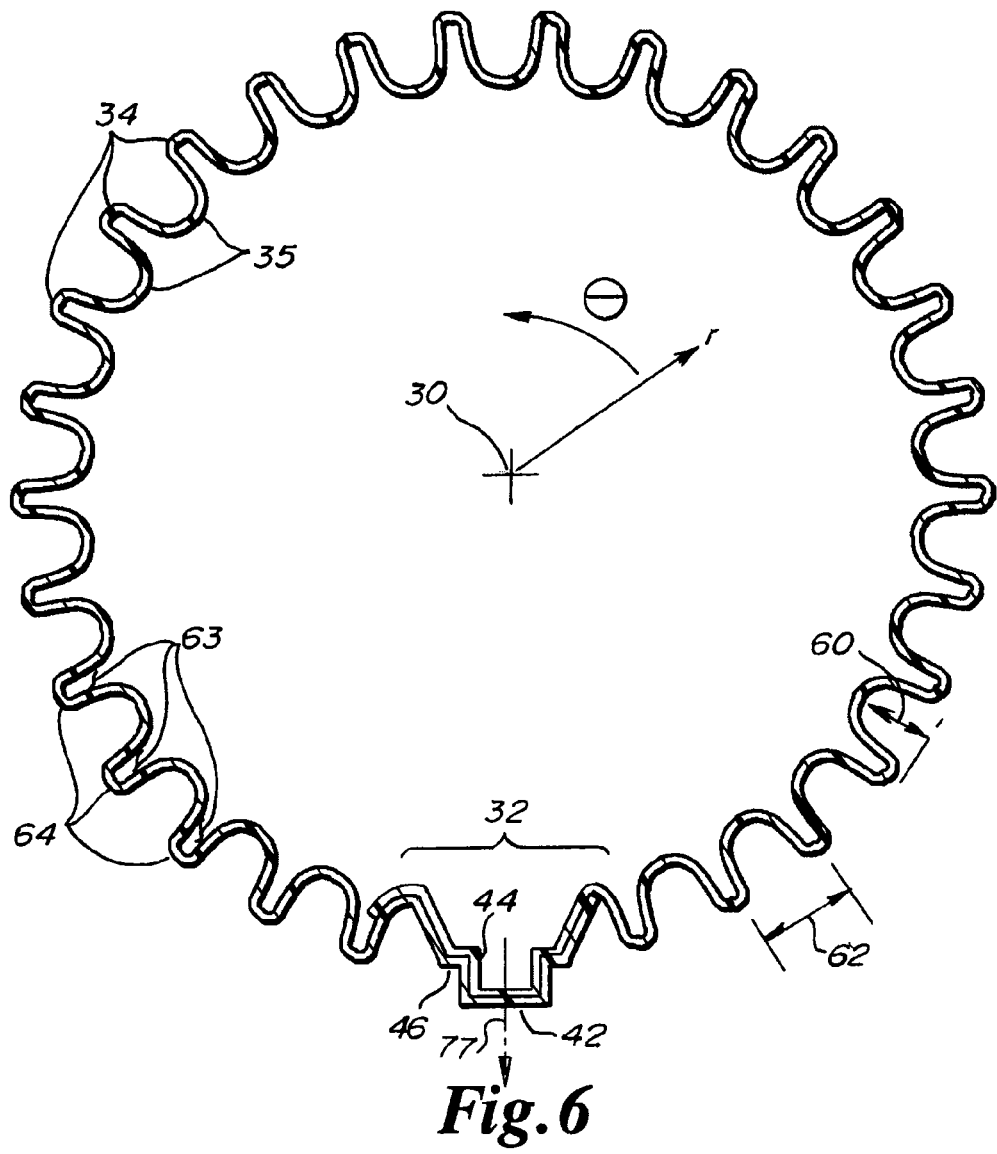
FIG. 6 is a first sectional view of the thermoformed grow tube of FIG. 5.
Figure 7:
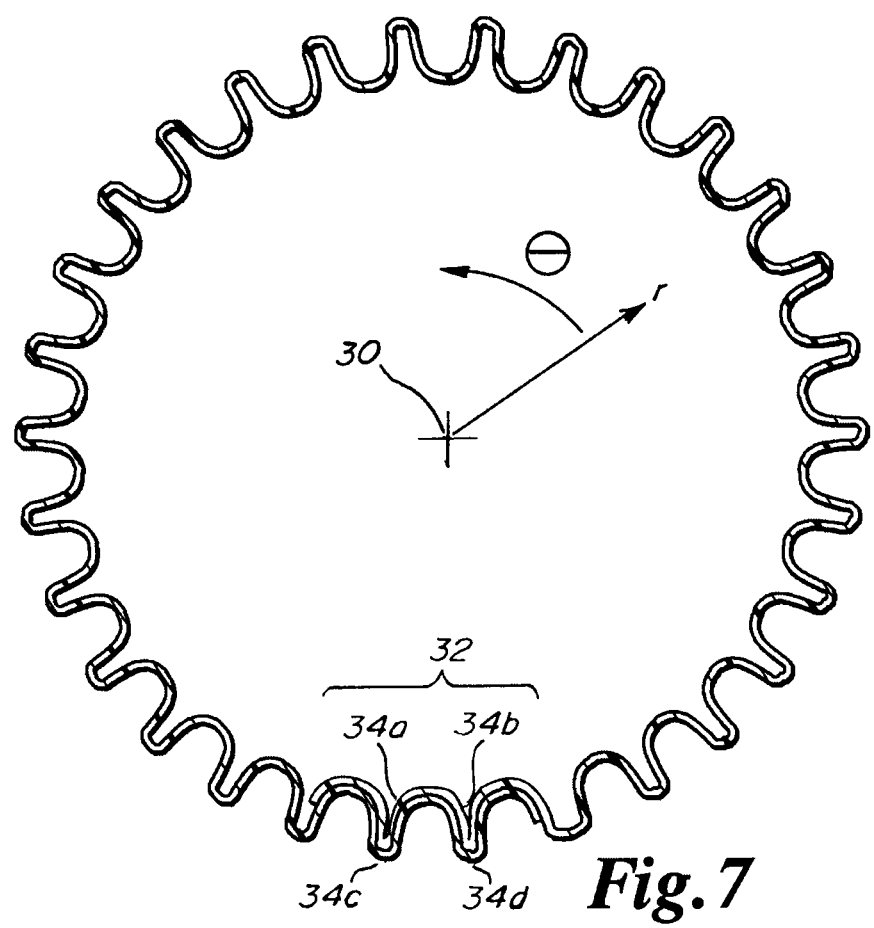
FIG. 7 is a second sectional view of the thermoformed grow tube of FIG. 5.

Referring to FIGS. 5 through 7, a grow tube 90 is depicted in a second embodiment of the invention. The grow tube 90 is formed from the same thermoformed sheet 66 and polymer sheet 22 as the grow tube 90. However, the direction of the rolling/curling operation is reversed so that the plurality of longitudinal ribs 34 extend radially outward from the cylinder 24 instead of inward. Accordingly, the grow tube 90 is characterized as having an interior surface 92 and an exterior surface 94 that extends beyond the radius of the top and bottom rims 40 and 38. Also, the snaps 42 project outward instead of inward. Otherwise, the various aspects of the grow tubes 24 and 90 operate in a similar manner, and the similar aspects of the grow tube 90 are identified with the same reference numerals as with grow tube 24.

The assembly of the grow tube 90 is similar to the assembly of grow tube 24. A difference is that the male snap form 46 is tucked inside the cylinder 24 at the overlap region 32 instead of the female snap form 44. Otherwise, the male and female snap forms 44 and 46 are aligned as with the grow tube 24 and snappingly engaged.

An advantage of the grow tube 90 over the grow tube 24 is that there is more room within the grow tube for a given diameter of the grow tube. The additional room can promote better air exchange with the surroundings, increase solar gain by increasing exposure of the leaf surface area, and be less restrictive on stem growth within the grow tube 90. Also, the snaps 42 project outward, further increasing the internal volume of the grow tube.

For the arrangement of the grow tube 90, the convex shape between adjacent longitudinal ribs 34 can tend to diffuse the rays of the sun as they pass through the material. The diffusion of the light is advantageous to promoting the growth of the plant, as the photoreceptors are less stressed than when they receive sunlight directly. Furthermore, the thermoformed sheet 66 or polymer sheet 22 can be matted or etched on the interior and/or exterior surfaces 26 and/or 28 to promote the diffusion of incident sunlight.

Referring to FIGS. 8 and 8A through 8D, a grow tube 96 fabricated from a formed sheet 98 is depicted in an embodiment of the invention. Aspects of the grow tube 96 that are similar to the grow tubes 24, 90 and 96 are identified with the same reference numerals. The grow tube 96 includes longitudinal ribs 100 that present a rounded or blunted contour to the interior of the grow tube 96, in contrast to the Gaussian-shaped contours of the longitudinal ribs 34 of grow tube 20. Also, the end portions 101 of the longitudinal ribs 100 can be radiused to provide a rounded transition instead of a tapered transition.

The grow tube 96 includes snap forms 102 and 103 configured to snappingly engage with each other, and protrude in a direction that is opposite the protruding direction of the longitudinal ribs 100. The snap forms 102 effectively interrupt a first longitudinal rib 104 so that a portion of the first longitudinal rib 104 extends between the snap forms 102. The snap forms 102 and the first longitudinal rib 104 can be centered along a common (first) axis, as depicted. Likewise, snap forms 103 effectively interrupt a second longitudinal rib 105 and can be centered on a common (second) axis. The grow tube 96 also includes tab regions 106 that are formed as flats across a number of the longitudinal ribs 100.

In assembly, the formed sheet 98 is rolled into a cylinder so that the protruding longitudinal ribs 100 are on the interior of the cylinder. The snap forms 102 and first longitudinal rib 104 are aligned with the snap forms 103 and second longitudinal rib 105 and the snap forms 102, 103 are snapped together. The first and second longitudinal ribs 103 and 105 mate together, providing alignment and registration of the ends of the formed sheet 98, as well as additional resistance to the shear forces exerted by the shape memory of the formed sheet 98.

By this assembly, the grow tube 96 provides protection of the plant against stem abrasion and pressure point wounds. By this assembly, the rim 40 defines an outer radius 106 of the grow tube 96 that is greater than the effective inner radius 107 defined by the projecting longitudinal ribs 100 (FIG. 10A).

Figure 9A:
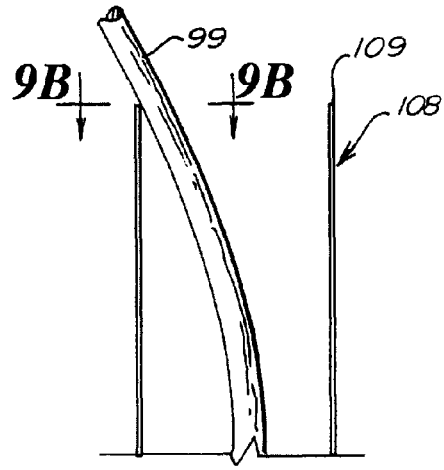
FIG. 9A is a sectional elevation view of a grow tube and resident plant of the prior art.
Figure 9B:
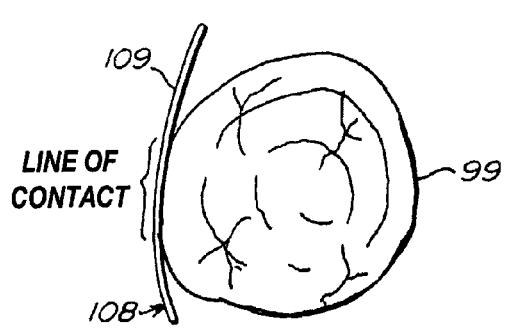
FIG. 9B is a partial sectional view of the grow tube and resident plant of FIG. 9A.

Referring to FIGS. 9A, 9B, 10A and 10B, a function of the grow tube 96 is now described in an embodiment of the invention. The FIGS. 9A and 9B depict a prior art grow tube 108, represented by a simple cylinder having an upper rim 109, and the stem of a resident plant 99 extending through the upper end of the grow tube 108. If the configuration of the stem 99 is temporal (e.g., is due to a present wind exerted on the crown of the stem 99), the stem 99 will collide with the upper rim 109, which can cause local damage to the cells of the stem 99 at the point of impact. As winds shift, the bending of the stem 99 will also shift, and in some cases cause the stem to become damaged in a continuous line, thereby girdling the stem.

If the configuration of the stem 99 is not temporal (e.g., is due to a deformation of the stem 99 so that the stem 99 is resting on the rim 109), the stem 99 is in constant contact with the upper rim 109 along a line of contact. When the stem 99 is a young, rapidly developing plant, the bark of the green stem is living tissue, or at least there is living tissue very near the surface. The cells under the line of contact are constantly under pressure, and are also cut off from nutrients due to the pressure line. The result is that the cells under the continuous line of pressure die. A lesion forms and the plant responds by forming a callous tissue over the lesion.

Figure 10A:
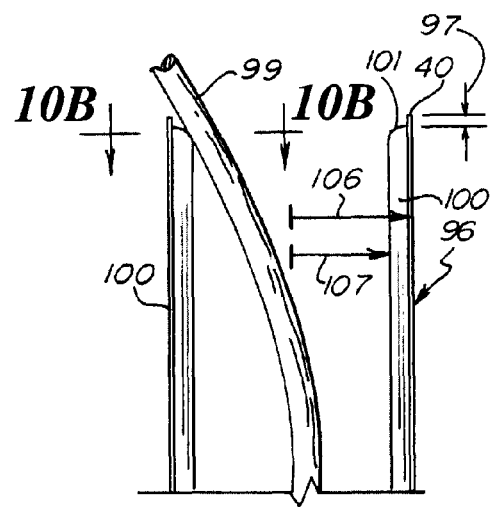
FIG. 10A is a sectional elevation view of the grow tube of FIG. 8 with resident plant in an embodiment of the invention.
Figure 10B:
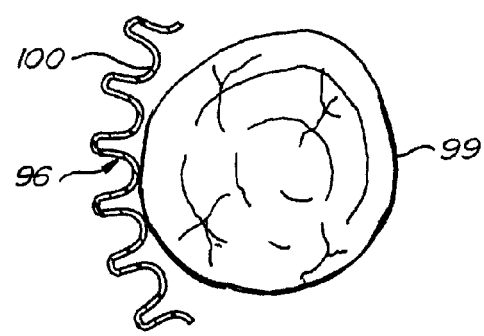
FIG. 10B is a partial sectional view of the grow tube and resident plant of FIG. 10A.
Figure 11:
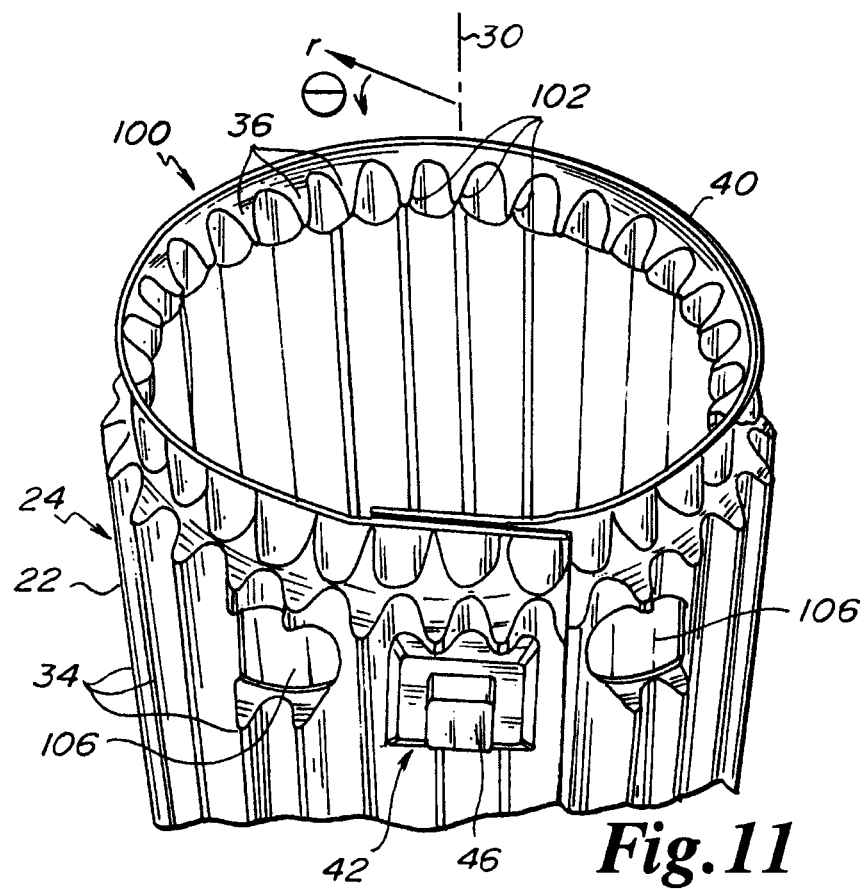
FIG. 11 is a partial perspective view of a thermoformed grow tube in a fourth embodiment of the invention.
Figure 11A:
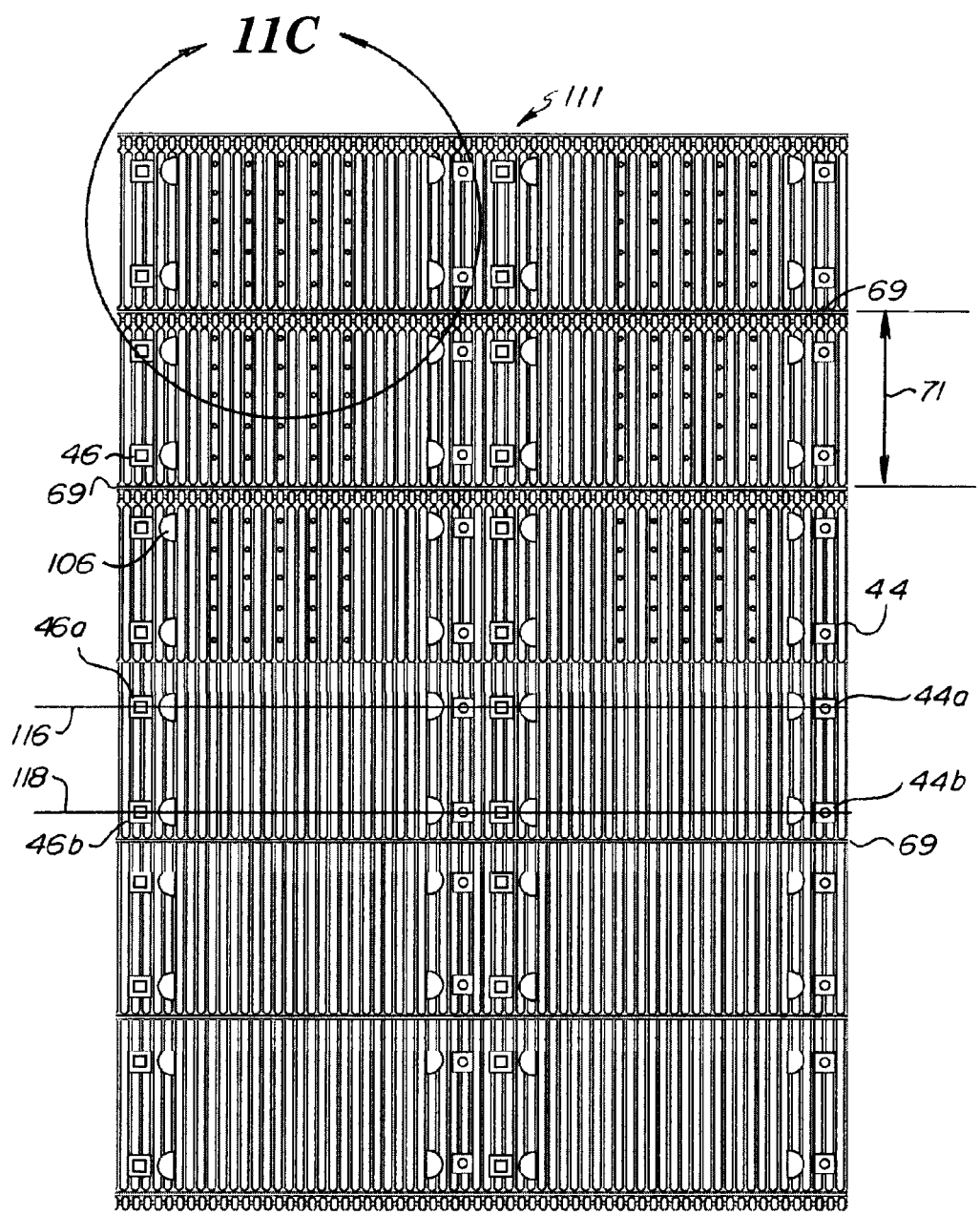
FIG. 11A is a plan view of a formed sheet from which the grow tube of FIG. 11 is formed.

As depicted in FIGS. 10A and 10B, certain embodiments of the present invention mitigate against stem abrasion and pressure point wounds, including the grow tube 96. With respect to temporal forces such as wind, the stem collides with the radiused ends 101 of the longitudinal ribs 100 instead of the rim 40. The rim 40 of FIG. 10A is characterized as having a rim dimension 97, i.e. a dimension that extends from the uppermost transition of the longitudinal ribs 100 to the uppermost portion of the rim 40. The radiused ends 101 can prevent the stem 99 from reaching the rim 40, and also provides a blunted, contoured surface that acts as a cushion or bumper that inflicts less damage on perimeter of the stem 99 than would the rim 40.

With respect to the scenario where the stem is resting on the grow tube, again the radiused ends 101 of the longitudinal ribs 100 hold the stem 99 away from the rim 40. In addition, the contour of the longitudinal ribs 100 provides non-continuous contact with the outer perimeter of the stem 99, thus limiting the pressure points to more discrete locations. The cells that neighbor the cells under pressure still receive nutrients, thus avoiding areas of stagnation that exacerbates lesion formation. Also, as winds or other forces act on the resident plant, the stem 99 will translate along the contour of the longitudinal ribs 100, so that the pressure points are imposed on a different part of the perimeter of the stem 99. This relieves the cells that were previously under pressure, enabling them to rebound and remain healthy.

Therefore, the discrete contact points of the present invention, along with the blunt, cushioning aspects provided by the ends of the longitudinal ribs, act to abate both stem abrasion and pressure point wounds. It is further noted that the other embodiments that define an effective inner radius or diameter that is sufficiently smaller than the outer radius or diameter of the rim will protect against stem damage. For example, the longitudinal ribs 34 of grow tube 20 having tapered transitions 36 can also provide the non-continuous, cushioning effect that abates stem abrasion and pressure point wounds.

The dimensional characteristics of the grow tubes (e.g., 20, 96) that prevents stem damage include the previously discussed aspect ratio of the cross-section of the longitudinal rib, the distance (i.e. height) that the rim 40 extends axially beyond the longitudinal ribs 34 or 100, and the outer and inner radii 106 and 107. Generally, a ratio of the lateral dimension to the normal dimension (inverse of the aspect ratio) is less than 3-to-1 can prevent a large variety of stem types from contacting the rim. Another characteristic that may prevent stem damage includes a rim dimension 97 that is approximately the same dimension as the normal dimension 80 of the longitudinal rib. Also, a grow tube having an inner radius 107 that is less than 95% of the outer radius 106 may prevent contact between the rim and the stem of a resident plant. Dimensionally, a longitudinal rib 34 or 100 having normal dimension 80 of 3 mm or greater and being spaced so that the elongate axes 74 are between 100% and 125% of the normal dimension 80 may prevent stem damage. In one embodiment, the longitudinal ribs 100 may have radiused ends and a normal dimension of approximately 5 mm with adjacent elongate axes 74 being spaced 6 mm apart and with the rim dimension 97 being 5 mm or less.

The above-mentioned characteristics of the grow tube 96 are guidelines for preventing stem damage, and are considered non-limiting. It is recognized that those skilled in the art are able to select the characteristics suitable for a given application, which may depend on the characteristics of the resident plant. Also, the skilled artisan may choose only one or two of the characteristics discussed above in tailoring a grow tube to their specific application.

Referring to FIGS. 11 and 11A through 11D, a grow tube 110 fabricated from a formed sheet 111 is depicted in an embodiment of the invention. Again, the aspects of the grow tube 110 that are similar to the grow tubes 24, 90 and 96 are identified with the same reference numerals. The grow tube 110 is configured similarly to grow tube 90, with the longitudinal ribs 34 extending radially outward from the cylinder 24. However, grow tube 110 further includes a plurality of protrusions 112 that are arranged in a row off the end of the longitudinal ribs 34. Each of the plurality of protrusions 112 can include a tapered transition 36 and is axially aligned with a respective one of the plurality of longitudinal ribs 34. The protrusions 112 protrude from the sheet plane 68 in a second normal direction 114 that is opposite to the normal direction 72.

Functionally, the protrusions 112 limit damage to the stems of the resident plant in the same manner as the tapered transitions 26 of the grow tube 24. However, because the protrusions extend only a short distance, the grow tube 110 shares the advantages of a larger interior volume of the grow tube 90. The tab regions 106 makes the slit line for the access tabs easier to identify and cut. In addition to providing access for engaging the snaps 42, the tab regions 106 also provide access for cable ties for securing the grow tube 110 to a grounding stake.

The form sheet 111 is also depicted as having male snap forms 44a, 44b and female snap forms 46a, 46b that are paired. That is, male snap forms 44a and 44b are paired with each other and the female snap forms 46a and 46b are paired with each other.

Functionally, the pairing provides two complete sets of snap forms on a given section. Accordingly, each section can be secured in the rolled form along two lateral axes 116 and 118 to secure the assembled grow tube.

Figure 8:
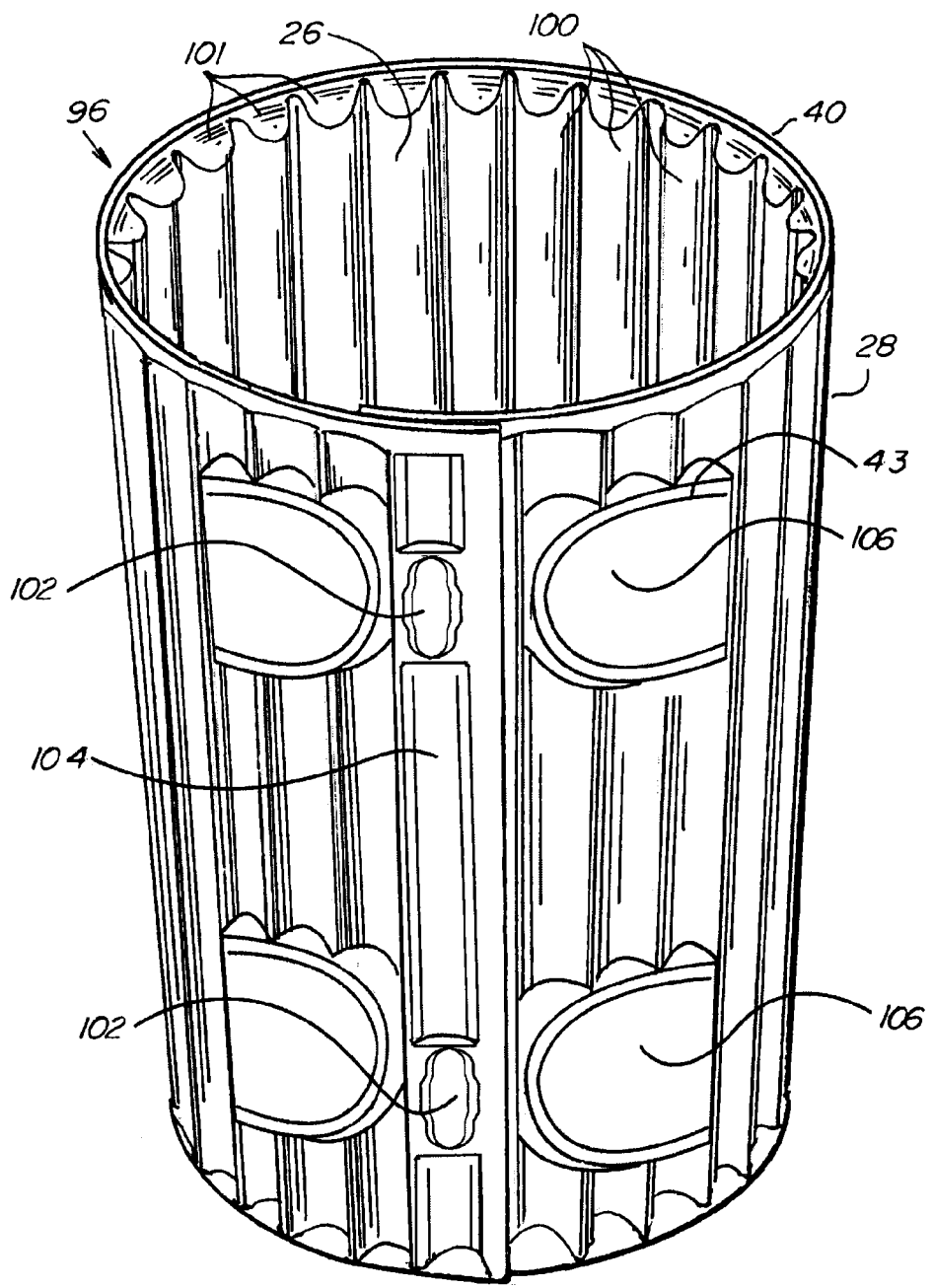
FIG. 8 is a perspective view of a thermoformed grow tube in a third embodiment of the invention.
Figure 8D:
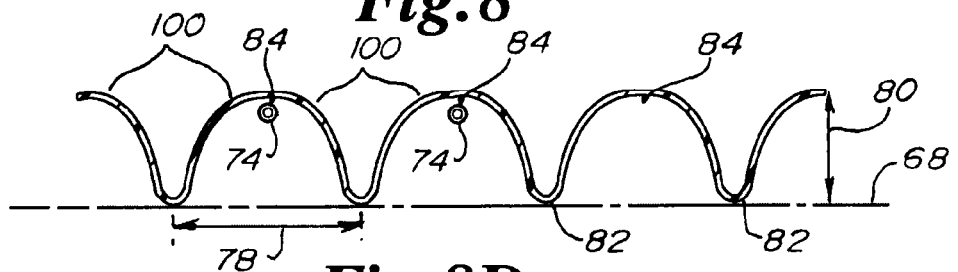
FIG. 8D is a partial sectional view of the thermoformed sheet of FIG. 8B.

The embodiments depicted herein include web portions having an effective radius that is substantially larger than the radius of the rib tip. We note that the present invention is in no way limited to this profile shape. The profile of the longitudinal ribs 34 can define any shape that provides an aspect ratio suitable to the application, including but not limited to webs and longitudinal ribs having equal radii, a triangular or "saw tooth" profile, a profile that defines substantially a "square wave" or a "sinusoidal wave," or combinations thereof. The orientation of the longitudinal ribs 34 and webs 35 can also be reversed so that the webs 35 are distal relative to the sheet plane 68 instead of the tips of the longitudinal ribs 34, as depicted in FIG. 8D.

Figure 12:
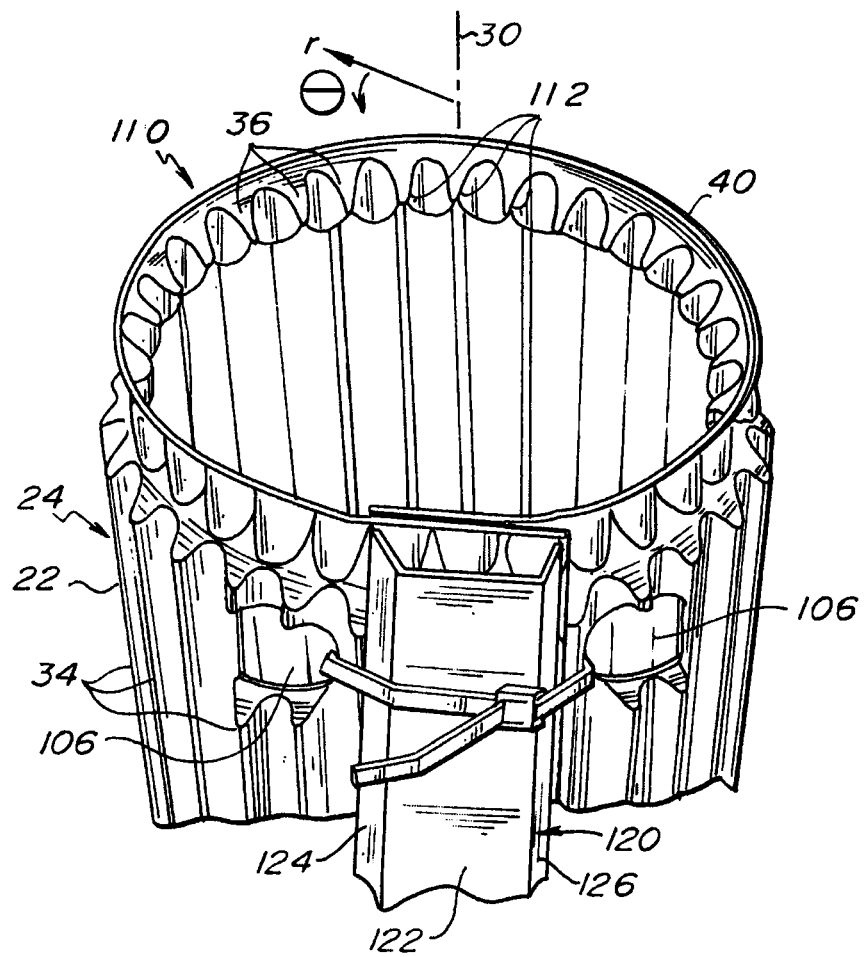
FIG. 12 is a perspective view of a thermoformed grow tube moored with a channeled stake in a fifth embodiment of the invention.
Figure 12A:
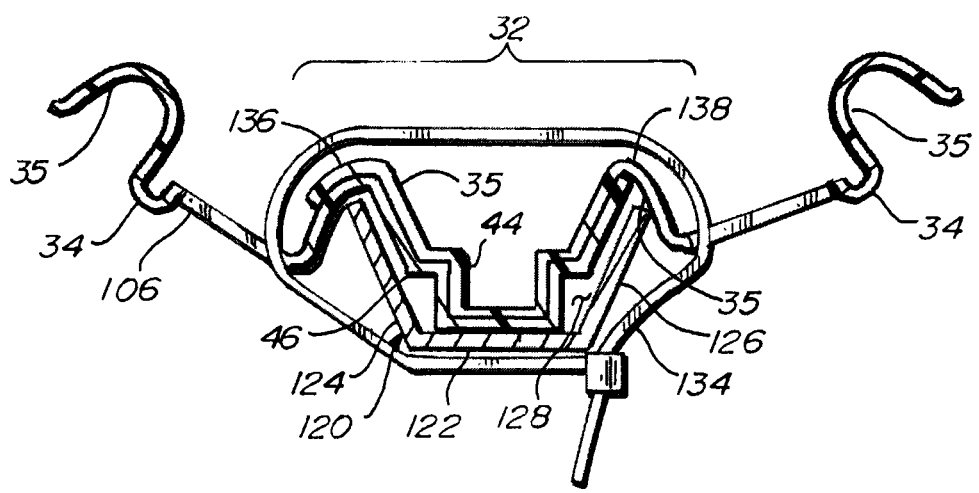
FIG. 12A is a partial sectional view of the thermoformed grow tube and channeled stake of FIG. 12.

Referring to FIGS. 12 and 12A, a channeled stake 120 for mooring the grow tube 110 is depicted in an embodiment of the invention. The channeled stake 120 comprises a web portion 122 and two flange portions 124 and 126 that define a channel recess 128 having a depth 130. The channel recess 128 can be dimensioned to accompany both the lateral width of the snaps 42 and the radial dimension of the snaps 42 from the webs 35 to the distal tip of the snaps 42. A cable tie 134 can be implemented to firmly secure the flanges 124 and 126 of the channeled stake 120 to the grow tube 110. The flanges 124 and 126 can register along two lines of contact 136 and 138 that extend vertically on either side of the snaps 42.

Functionally, the channeled stake 120 can serve several purposes:
- protects the snaps 42 from being damaged by mechanical contact and from being weakened due to overexposure to ultraviolet radiation from the sun
- enables the grow tube 110 to be securely moored without crushing the protruding snaps 42
- provides dual registration lines along the length of the grow tube 110 that stabilizes the grow tube 110 against the channeled stake 120
- reduces the cross-section of the mooring stake relative to conventional stakes, thus requiring less energy to install them into the earth The channel can be made of a variety of materials, including wood or wood fibers for biodegradability, or resin materials such as fiber reinforced plastic for long term life and reusability.

References to relative terms such as upper and lower, front and back, left and right, or the like, are intended for convenience of description and are not contemplated to limit the invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention and are limited only by the claims.

For purposes of interpreting the claims for the present invention, it is expressly intended that the provisions of Section 112, sixth paragraph of 35 U.S.C. are not to be invoked unless the specific terms "means for" or "step for" are recited in the subject claim.

What is claimed is:

1. A thermoformed sheet stock for a grow tube, comprising:
    a sheet of polymer having a first lateral band and a second lateral band defining a shortest distance therebetween, said sheet having a structure formed thereon and defining a baseline plane, said structure including:
        a plurality of longitudinal ribs that protrude in a first direction normal to said baseline plane, each of said plurality of longitudinal ribs defining an elongate axis that extends in a direction parallel to said shortest distance, said plurality of longitudinal ribs thereby defining a plurality of elongate axes, said plurality of elongate axes being substantially parallel to each other, each of said plurality of longitudinal ribs defining a rib length along a respective of said elongate axes, said rib length being less than said minimum length between said first lateral band and said second lateral band; and
        a first male snap form and a first female snap form, each centered along a first lateral axis that is orthogonal to said elongate axes, said first male snap form being configured to snappingly engage within said first female snap form, said first male snap form and said first female snap form each protruding in the same direction from said baseline plane,
        wherein a first of said plurality of longitudinal ribs is terminated proximate said first male snap form and a second of said plurality of ribs is terminated proximate said first female snap form, said first of said plurality of longitudinal ribs being configured to mate with said second of said plurality of longitudinal ribs.

2. The thermoformed sheet stock of claim 1, wherein said structure includes a second male snap form and a second female snap form, each centered along a second lateral axis that is orthogonal to said elongate axes, said second male snap form being configured to snappingly engage within said second female snap form, said second male snap form and said second female snap form protruding in the same direction from said baseline plane.

3. The thermoformed sheet stock of claim 2, wherein:
    said first and second male snap forms are centered at a first spaced distance from each other along a first axis that is parallel to said elongate axes; and
    said first and second female snap forms are centered at a second spaced distance from each other along a second axis that is parallel to said first axis, said first axis and said second axis defining a lateral distance therebetween.

4. The thermoformed sheet stock of claim 1, wherein said first male snap form is centered along the elongate axis of said first of said plurality of longitudinal ribs, and said first female snap form is centered along the elongate axis of said second of said plurality of longitudinal ribs.

5. The thermoformed sheet stock of claim 1, wherein:
    said plurality of elongate axes are spaced apart to define a lateral dimension between respective elongate axes, each of said plurality of longitudinal ribs having a cross-section that defines a normal dimension that is normal to said baseline plane; and
    a ratio of said lateral dimension to said normal dimension is less than 3-to-1.

6. The thermoformed sheet stock of claim 1 wherein said first lateral band is a first edge of said sheet and said second lateral band is a second edge of said sheet that is parallel to said first edge of said sheet.

7. The thermoformed sheet stock of claim 1 wherein said first lateral band is substantially parallel with said second lateral band.

8. A grow tube, comprising:
    a substantially cylindrical body defining a central axis and having a first end and a second end, said first end being defined by a first rim and said second end being defined by a second rim;
    a plurality of longitudinal ribs that extend substantially parallel to each other and substantially parallel to said central axis, each of said plurality of longitudinal ribs defining an elongate axis, said plurality of longitudinal ribs thereby defining a plurality of elongate axes, each of said plurality of longitudinal ribs defining a radial inward projection with respect to said first and second rims and including one of a tapered and a radiused transition on at least one end; and means for dimensioning said plurality of longitudinal ribs to prevent a stem from a resident plant from contacting said rim.

9. The grow tube of claim 8, further comprising:
a first male snap form and a first female snap form, each centered along a first lateral axis that is orthogonal to said plurality of longitudinal ribs, said first male snap form being configured to snappingly engage within said first female snap form along an axis that extends radially from said central axis.

10. The grow tube of claim 8, wherein said cylindrical body comprises a thermoformed material.

11. The grow tube of claim 8 wherein:
said plurality of elongate axes are spaced apart to define a lateral dimension between respective elongate axes, each of said plurality of longitudinal ribs having a cross-section that defines a normal dimension that is normal to said baseline plane; and
said means for dimensioning includes configuring said longitudinal ribs for a ratio of said lateral dimension to said normal dimension is less than 3-to-1.

12. A method of providing a grow tube, comprising:
providing a sheet of thermoformed polymer, said sheet defining a baseline plane and having structure, said structure including:
a plurality of longitudinal ribs that protrude in a first direction normal to said baseline plane, each of said plurality of longitudinal ribs defining an elongate axis to define a plurality of elongate axes, said plurality of elongate axes being substantially parallel to each other, said plurality of elongate axes being spaced apart to define a lateral dimension between respective elongate axes, each of said longitudinal ribs having a cross-section that defines a normal dimension that is normal to said baseline plane; and
a male snap form and a female snap form configured to snappingly engage with each other, each of said male and female snap forms defining protrusions on said sheet that extend in the same direction from said baseline plane, said male and female snap forms being located on a common lateral axis that is orthogonal to said elongate axes; and
providing a set of instructions on a tangible medium, said instructions substantively comprising:
forming a cylinder with said sheet so that said plurality of elongate axes are substantially parallel to a central axis of said cylinder;
aligning said male snap form with said female snap form along a radial axis; and
engaging said male snap form with said female snap form.

13. The method of claim 12, wherein said structure of said sheet provided in the step of providing said sheet of thermoformed plastic further comprises a plurality of protrusions, each protrusion being aligned with and located adjacent an end of a corresponding one of said first plurality of longitudinal ribs, said protrusions protruding in a direction opposite said first direction.

14. The method of claim 12 wherein said male snap form and said female snap form of said sheet provided in the step of providing said sheet of thermoformed plastic protrude in the same direction as said plurality of longitudinal ribs.

15. The method of claim 12 wherein a ratio of said lateral dimension to said normal dimension is less than 3-to-1.

* * * * *